United States Patent

[11] 3,574,321

| [72] | Inventor | Richard Scheerer |
| | | Murrhardt Wurttemberg, Germany |
| [21] | Appl. No. | 867,562 |
| [22] | Filed | Oct. 20, 1969 |
| [45] | Patented | Apr. 13, 1971 |
| [73] | Assignee | Murrhardter Waagenfabrik Gebruder Soehnle |
| | | Murrhardt Wurttemberg, Germany |
| [32] | Priority | Oct. 22, 1968 |
| [33] | | Germany |
| [31] | | G6803306 |

[54] SLIDING WEIGHT SCALE FOR DIFFERENT WEIGHT UNITS
9 Claims, 4 Drawing Figs.

[52] U.S. Cl.................................................... 177/247, 177/250
[51] Int. Cl..................................................... G01g 1/32, G01g 1/36
[50] Field of Search........................................... 177/235, 246, 247, 250, 252

[56] References Cited
UNITED STATES PATENTS

| 859,730 | 7/1907 | Betz | 177/247X |
| 920,942 | 5/1909 | Fleming | 177/250 |

FOREIGN PATENTS

| No. 13,642 | 0/1885 | Great Britain | 177/250 |
| No. 21,111 | 0/1905 | Great Britain | 177/250 |
| 235,109 | 6/1925 | Great Britain | 177/250 |
| 854,450 | 11/1960 | Great Britain | 177/247 |

Primary Examiner—Robert S. Ward, Jr.
Attorney—Michael S. Striker

ABSTRACT: A platform scale has a balance beam with at least two graduated scales having different units of weight. A weight is slidable along two graduated scales and carries two arresting teeth whose relative position can be adjusted so that only one arresting tooth cooperates at any time with recesses of a scale beam having the selected graduated scale.

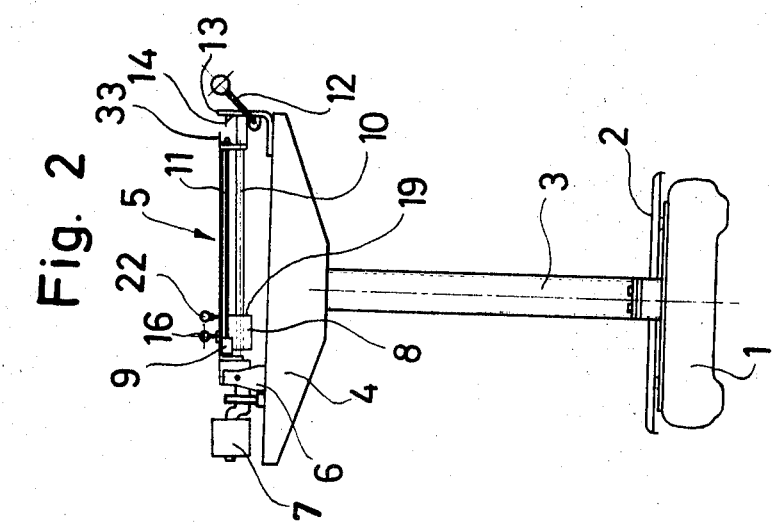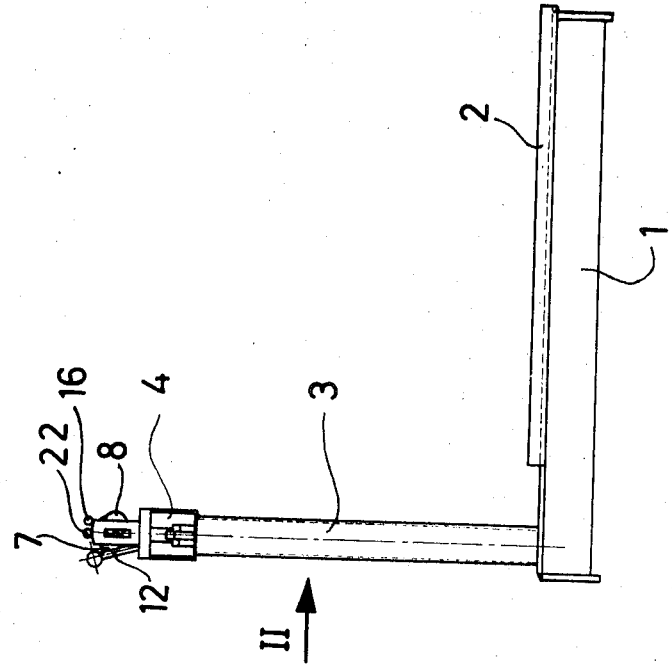

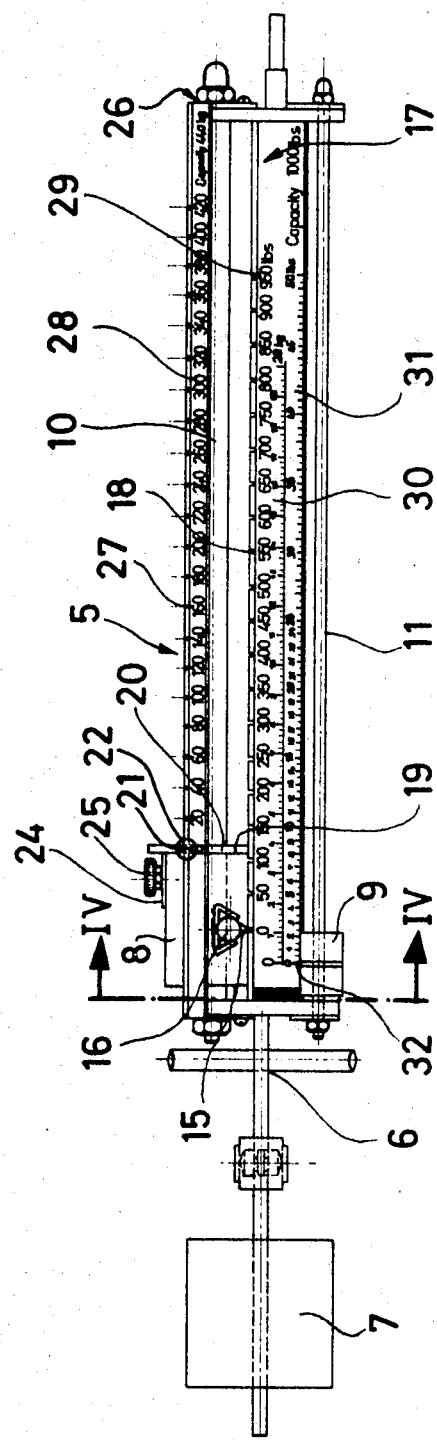

SLIDING WEIGHT SCALE FOR DIFFERENT WEIGHT UNITS

BACKGROUND OF THE INVENTION

It is known to provide the weight which slides along the balance beam of a scale, with an arresting tooth cooperating with recesses indicating units of a graduated scale.

The sliding weight scales according to the prior art do not permit indication of the measured weight in different weight units, such as pounds and kilograms.

It is one object of the invention to provide a sliding weight scale which can be set to indicate the measured weight in different weight units.

Another object of the invention is to arrest the sliding weight at each unit of a selected one of at least two graduated scales having different units of measure.

Another object of the invention is to provide a very simple construction which can be easily adjusted to indicate the measured weight in different units of weight.

SUMMARY OF THE INVENTION

With these objects in view, the present invention provides on the sliding weight two arresting teeth, and on the balance beam two scales having different measuring units. The two arresting teeth, which cooperate with corresponding recesses on the scale beams, are mounted on the balance beam for relative movement, and can be secured to the same in an adjusted and selected relative position in which only one of the arresting teeth is effective.

One embodiment of the invention comprises a balance beam including a slide rail, and scale beams with first and second graduated scales having different first and second weight units, respectively; sliding weight means mounted on the slide rail for movement along the first and second graduated scales; first and second arresting means mounted on the sliding weight and having inoperative positions, and first and second arresting positions, respectively, engaging the scale beam means for arresting the sliding weight at points correlated with the first and second weight units of the first and second graduated scales, respectively; and means for securing to the weight means, a selected one of the arresting means in the respective arresting position and the respective other arresting means in the inoperative position.

At least one arresting means is secured to the weight means adjustable relative to the other arresting means. The position of the arresting weight on the slide rail, indicates the measured weight in the first or second weight units when the first and second arresting means are in the first and second arresting positions, respectively.

The scale beam means include first and second scale beams provided with the first and second graduated scales, respectively, and having recesses at each unit cooperating with first and second arresting teeth of the first and second arresting means.

In the preferred embodiment of the invention, the first arresting tooth is fixedly secured to the sliding weight, and the second arresting tooth is mounted on the same for angular movement, and secured to the sliding weight by a clamping screw. The sliding weight has an eccentric bore through which the slide rail passes, so that the center of the sliding weight is spaced from the bore and slide rail, permitting turning of the sliding weight about the slide rail together with the first arresting tooth and relative to the second arresting tooth. The eccentric weight of the sliding weight urges the first arresting tooth against the respective scale beam.

Preferably, a small second sliding weight is provided with a pointer cooperating with third and fourth graduated scales representing the first and second weight units on a larger scale for fine adjustment. It is advantageous to provide the first graduated scale on the first scale beam, and the second, third and fourth graduated scales on the second scale beam.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing.

BRIEF DESCRIPTION OF THE DRAWING

FIG. 1 is a side elevation illustrating a platform scale in accordance with the invention;

FIG. 2 is a rear elevation taken in the direction of the arrow II in FIG. 1;

FIG. 3 is a fragmentary plan view illustrating the balance beam of the scale on an enlarged scale.

DESCRIPTION OF THE PREFERRED EMBODIMENTS

Figure 4:
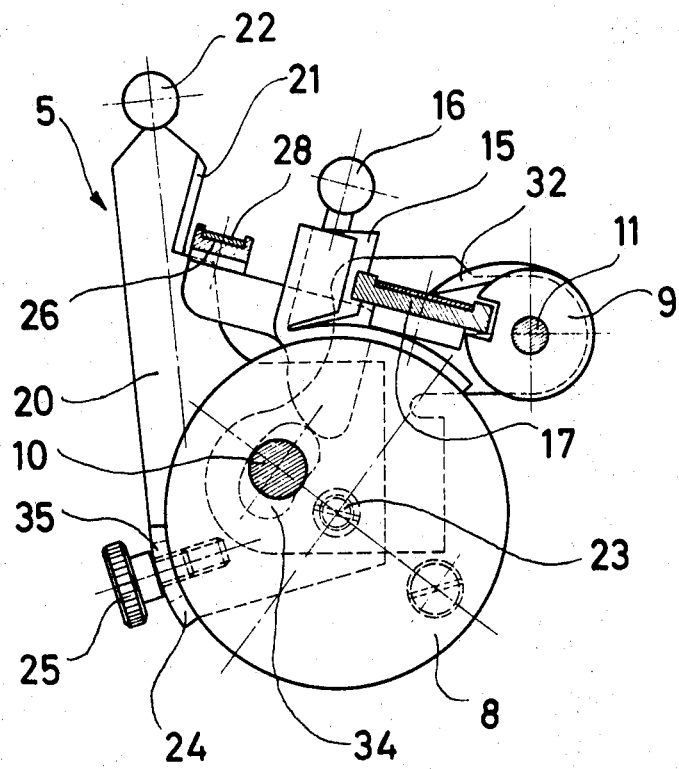
FIG. 4 is a cross-sectional view taken on line IV-IV and being drawn to a larger scale than FIG. 3.

Referring first to FIGS. 1 and 2, a platform scale has a base 1 on which a platform 2 is movably mounted. The base 1 carries a vertical supporting tube 3 which carries a head 4 with a main bearing 6 on which the double-armed balance beam 5 is mounted. A counterbalancing weight 7 is adjustably supported on the shorter arm of the balance beam 5, while the longer arm comprises a first slide rail 10 for a large sliding weight 8, and a second slide rail 11 for a small slide weight 9, as best seen in FIG. 3. Sliding weights 8 and 9 can be moved along the slide rails 10 and 11, respectively, until the balance beam is in a balanced position in which the tongue 33 is located in the same horizontal plane as the tongue 14 which is secured to a bracket on head 4. The weight on platform 2 displaces a linkage including a lever system in the hollow support tube 3, and acting on the shorter arm of the balance beam 5, as is conventional for platform scales. A manually operated lever with lever 12 with a cam portion can be turned to a position in which the balance beam is locked, as shown in FIG. 2.

As best seen in FIG. 4, a first arresting tooth 15 is fixedly secured to the large sliding weight 8, and is provided with a handle 16. Arresting tooth 15 cooperates with recesses 18 of a scale beam 17 which is parallel to slide rails 10 and 11, and has a graduated scale 29 whose units of weight are pounds. The arresting recesses 18 are spaced from each other corresponding to a multiple of the pound unit, for example a distance representing 50 pounds.

The sliding weight 8 is of cylindrical shape, and has an eccentric bore through which slide rail 10 passes which supports sliding weight 8 not only for longitudinal movement, but also for angular movement. Since the center of gravity of sliding weight 8 is spaced from slide rail 10, sliding weight 8 tends to turn in clockwise direction, as viewed in FIG. 4 whereby arresting tooth 15 is urged to enter the recesses 18 in scale beam 17.

On one end of sliding weight 8, a mounting plate 20 is located which is supported by a pivot 23 in the axis of sliding weight 8, and carries a second arresting tooth 21 which cooperates with recesses 27 of a second scale beam 26 which is parallel to slide rail 10 and has a graduated scale 28 whose units are multiples of kilogram. Recesses 27 are spaced distances corresponding to 20 kilogram.

A curved slot 34, whose center of curvature is located in the axis of pivot 23 and weight 8, permits turning movement of mounting plate 20 and arresting tooth 21 when handle 22 is manually operated. Mounting plate 20 has a mounting portion 24 bent about the peripheral surface of sliding weight 8, and having a slot through which a clamping screw 25 passes into a threaded bore of weight 8. When second arresting means 21 to 24 is turned relative to weight 8 and first arresting means 15, 16, screw 25 can be manually operated to secure the second arresting means to the sliding weight 8 in a position in which the second arresting tooth 21 cooperates with the recesses 27, while the first arresting tooth 15 is in an inoperative position spaced from the recesses 18.

While the scale beam 26 has only one graduated scale 28, scale beam 17 has the second graduated scale 29, and also third and fourth graduated scales 30 and 31 in which the kilogram and pound units are graduated on a larger scale. The second sliding weight 9, which is smaller than sliding weight 8 and has a lesser weight, is slidable along the graduated scales 30 and 31 on slide rail 11, and has a pointer 32 indicating the graduations of the graduated scales 30 and 31 for fine adjustment of the balance beam.

In the position illustrated in FIGS. 3 and 4, pounds are selected to be the measuring units, and for coarse measuring, sliding weight 8 is moved along slide rail 10 until arresting tooth 15 engages one of recesses 18 selected so that the tongue 33 on balance beam 5 approaches the fixed tongue 14, see FIG. 2.

A fine adjustment is then obtained by moving the small sliding weight 9 along slide rail 11 to a position in which tongues 33 and 14 are located in the same plane, the measured weight being indicated in pounds by the arresting tooth 15 and the pointer 32.

While arresting tooth 15 cooperates with scale beam 17 and recesses 18, arresting tooth 21 is in an inoperative position, as shown in FIG. 4, and the sliding weight 8 is not influenced by recesses 27 in scale beam 26 whose graduated scale represents kilogram.

When a weight on platform 2 is to be measured in kilogram, first clamping screw 25 is loosened. Handles 16 and 22 are then operated so that the arresting teeth 15 and 21 are moved toward each other which is possible due to the curved slot 34 in mounting plate 20, and slot 35 in mounting portion 24. The arresting means 20 to 24 can be turned relative to sliding weight 8 and arresting tooth 15 about the axis of pivot 23 to a position in which arresting tooth 21 cooperates with recesses 27 of scale beam 26 which has the kilogram scale, while arresting tooth 15 is in an inoperative position, not shown, spaced from the recesses 18 in scale beam 17 whose graduated scale 29 represents pounds.

When the weight on platform 2, transmitted by a lever system through base 1 and support tube 3 to the short arm of the balance beam, is balanced by shifting the larger weight 8 along slide rail 10, and the smaller weight 9 along slide rail 11, the measured weight is indicated in 20 kilogram units by tooth 21, and in kilogram units by pointer 32 of the small sliding weight 9. Since the apparatus of the invention permits the measuring of a weight in two different systems of weight units, it is not only possible to read the weight of a weighted body in kilograms or pounds, or other units, but is also possible to use the same scale in different countries in which different weight units are used. A easy manual operation, which can be carried out by an unskilled person, permits adaptation of the scale to the respective desired system of weight units.

It will be understood that each of the elements described above, or two or more together, may also find a useful application in other types of scales differing from the types described above.

While the invention has been illustrated and described as embodied in a sliding weight scale for weighing in different weight units and having graduated scales representing different weight units, it is not intended to be limited to the details shown, since various modifications and structural changes may be made without departing in any way from the spirit of the present invention.

I claim:

1. Sliding weight scale for different weight units comprising, in combination, balance beam means including scale beam means with first and second graduated scales having different first and second weight units, respectively; sliding weight means mounted on said balance beam means for movement along said first and second graduated scales; first and second arresting means mounted on said sliding weight means and having inoperative positions, and first and second arresting positions, respectively, engaging said scale beam means for arresting said sliding weight means at points correlated with said first and second weight units of said first and second graduated scales, respectively; and means for securing to said weight means at least one of said arresting means for movement relative to the respective other arresting means so that one of said first and second arresting means is in the respective arresting position when the respective other arresting means is in said inoperative position so that the position of the arrested weight means relative to said first and second graduated scales indicates the measured weight in said first and second weight units, respectively, when said first and second arresting means are in said first and second arresting positions, respectively.

2. The scale claimed in claim 1 wherein said scale beam means include a first scale beam having said first graduated scale, and a second scale beam having said second graduated scale; and wherein said first and second scale beams are parallel to said slide rail, and have first and second spaced recesses successively engageable by said first and second arresting means during movement of said weight means along said slide rail.

3. The scale claimed in claim 1 wherein said scale beam means include a first scale beam having said first graduated scale, and a second scale beam having said second graduated scale.

4. The scale claimed in claim 1 wherein said scale beam means include a first scale beam having said first graduated scale and first recesses spaced at least one unit of the same, and a second scale beam having said second graduated scale and second recesses spaced at least one unit of the latter; wherein said first arresting means includes a first arresting tooth for engaging said first recesses for arresting said weight means in different positions along said slide rail; wherein said second arresting means includes a second arresting tooth for engaging said second recesses; comprising means mounting at least one of said first and second arresting means on said weight means for movement relative to the respective other arresting means, and wherein said securing means secure said first arresting means and said second arresting means to said sliding weight means in a selected one of two relative positions of said first and second arresting teeth in which said first and second arresting teeth, respectively, are in said first and second arresting positions, respectively, and the respective other arresting teeth of said first and second arresting teeth are in inoperative positions spaced from the respective recesses.

5. Sliding weight scale for different weight units comprising, in combination, balance beam means including scale beam means with first and second graduated scales having different first and second weight units, respectively; sliding weight means mounted on said balance beam means for movement along said first and second graduated scales; first and second arresting means mounted on said sliding weight means and having inoperative positions, and first and second arresting positions, respectively, engaging said scale beam means for arresting said sliding weight means at points correlated with said first and second weight units of said first and second graduated scales, respectively, said first arresting means being fixedly secured to said weight means and including a first arresting tooth cooperating with said scale beam means, and said second arresting means including a second arresting tooth, and means mounting said second arresting tooth for angular movement on said weight means; and means for securing said mounting means fixedly to said weight means in a selected angular position of said second arresting tooth so that one of said first and second arresting means is in the respective arresting position when the respective other arresting means is in said inoperative position so that the position of the arrested weight means relative to said first and second graduated scales indicates the measured weight in said first and second weight units, respectively, when said first and second arresting means are in said first and second arresting positions, respectively.

6. The scale claimed in claim 5 wherein said balance beam means includes a slide rail; wherein said weight means is mounted on said slide rail for angular movement with said first arresting means for placing the same selectively in said inoperative and first arresting positions; and wherein said attaching means secure said first and second arresting means to each other in two different relative positions in which a selected one of said first and second arresting means is in the respective arresting position and the respective other arresting means is in said inoperative position.

7. The scale claimed in claim 6 wherein said weight means is eccentrically mounted on said slide rail and tends to assume a position in which said first arresting means is in said arresting position.

8. The scale claimed in claim 7 wherein said weight means has an eccentric cylindrical bore through which said slide rail passes for supporting said weight means with said first arresting means for longitudinal movement along the same and also for angular movement.

9. The scale claimed in claim 8 wherein said mounting means of said second arresting means include pivot means, a mounting plate supported by said pivot means for angular movement about the center of said weight means, said mounting plate having a mounting portion bent along the periphery of said weight means and formed with a slot, said mounting plate supporting said second arresting tooth; and wherein said attaching means include a clamping screw passing through said slot into said weight means for securing said mounting plate with said second arresting tooth in a selected angular position to said weight means whereby said weight means and said first arresting means are secured to said second arresting means in a selected relative position.